United States Patent
Jana et al.

(10) Patent No.: US 6,604,166 B1
(45) Date of Patent: Aug. 5, 2003

(54) MEMORY ARCHITECTURE FOR PARALLEL DATA ACCESS ALONG ANY GIVEN DIMENSION OF AN N-DIMENSIONAL RECTANGULAR DATA ARRAY

(75) Inventors: Soumya Jana, Calcutta (IN); Pankaj Bansal, Mathura (IN); Balvinder Singh, Roorkee (IN)

(73) Assignee: Silicon Automation Systems Limited, Indiranagar (IN)

( * ) Notice: Subject to any disclaimer, the term of this patent is extended or adjusted under 35 U.S.C. 154(b) by 0 days.

(21) Appl. No.: 09/467,505

(22) Filed: Dec. 20, 1999

Related U.S. Application Data

(60) Provisional application No. 60/114,374, filed on Dec. 30, 1998.

(51) Int. Cl.[7] .............................................. G06F 12/00
(52) U.S. Cl. ........................... 711/5; 711/157; 711/217
(58) Field of Search ............................ 711/5, 157, 217; 345/540

(56) References Cited

U.S. PATENT DOCUMENTS

| | | | | |
|---|---|---|---|---|
| 4,603,348 A | * | 7/1986 | Yamada et al. | 358/500 |
| 4,740,927 A | * | 4/1988 | Baker et al. | 345/572 |
| 4,918,600 A | * | 4/1990 | Harper et al. | 711/157 |
| 5,481,487 A | * | 1/1996 | Jang et al. | 708/401 |
| 5,740,340 A | * | 4/1998 | Purcell et al. | 345/418 |
| 5,835,971 A | * | 11/1998 | Ikeda | 711/220 |

* cited by examiner

Primary Examiner—Reginald G. Bragdon
(74) Attorney, Agent, or Firm—Welsh & Katz, Ltd.

(57) ABSTRACT

A memory architecture is provided to enable parallel access along any dimension of an n-dimensional data array. To enable parallel access of s data elements along any dimension, the data elements of n-dimensional data array are mapped to s parallel memory banks in such a way that consecutive s data elements along any dimension are mapped to different memory banks. This mapping is defined by two functions, which define the memory bank number and location within a memory bank for each data element in n-dimensional data array. The necessary and sufficient conditions, which the mapping functions should satisfy in order to enable parallel data access, are described. These generic function pairs are described for all combinations of (n, s). Two particular instances of the mapping, namely circular permutation (rotation) along $0^{th}$ dimension and dyadic permutation along $0^{th}$ dimension have been discussed in detail. The mapping defined as dyadic permutation along $0^{th}$ dimension holds only for values of s, which is integer power of 2. The mapping defined as circular rotation holds for any integer value of s. For these mappings, the basic architecture as well as its extensions are discussed. The basic architecture is for n-dimensional data array which has only s data elements along each dimension, whereas the extensions are for data arrays with m data elements along each dimension under the constraint that m is an integer multiple of s.

20 Claims, 9 Drawing Sheets

Memory architecture for (*m,n*)-hyper-matrix

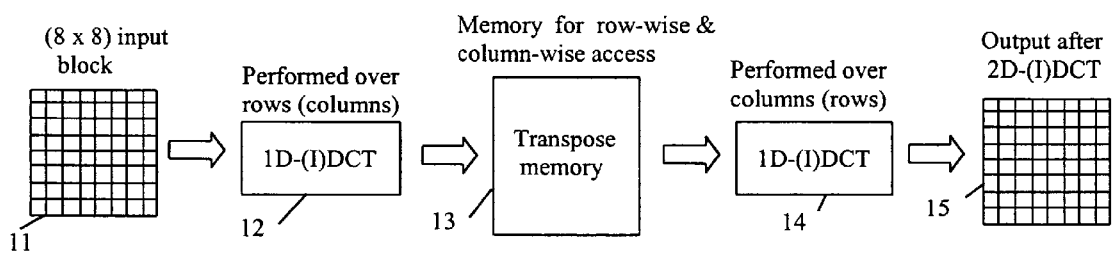
Figure 1: 2D-(I)DCT implemented using 1D-(I)DCT (Prior ART)
PRIOR ART

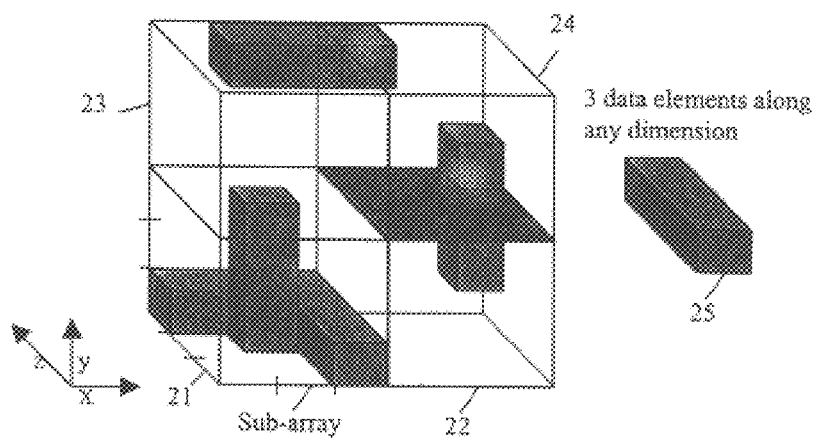
Figure 2: An illustration of the possible accesses in proposed memory architectures for 3-dimensional data array with s=3

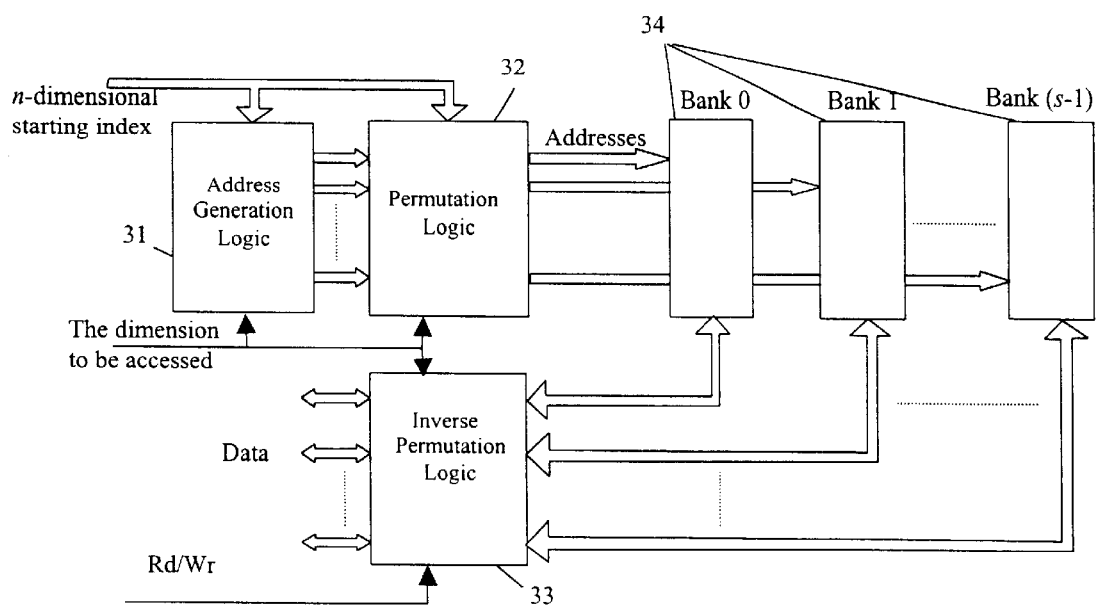
Figure 3: Memory architecture for (*m*,*n*)-hyper-matrix

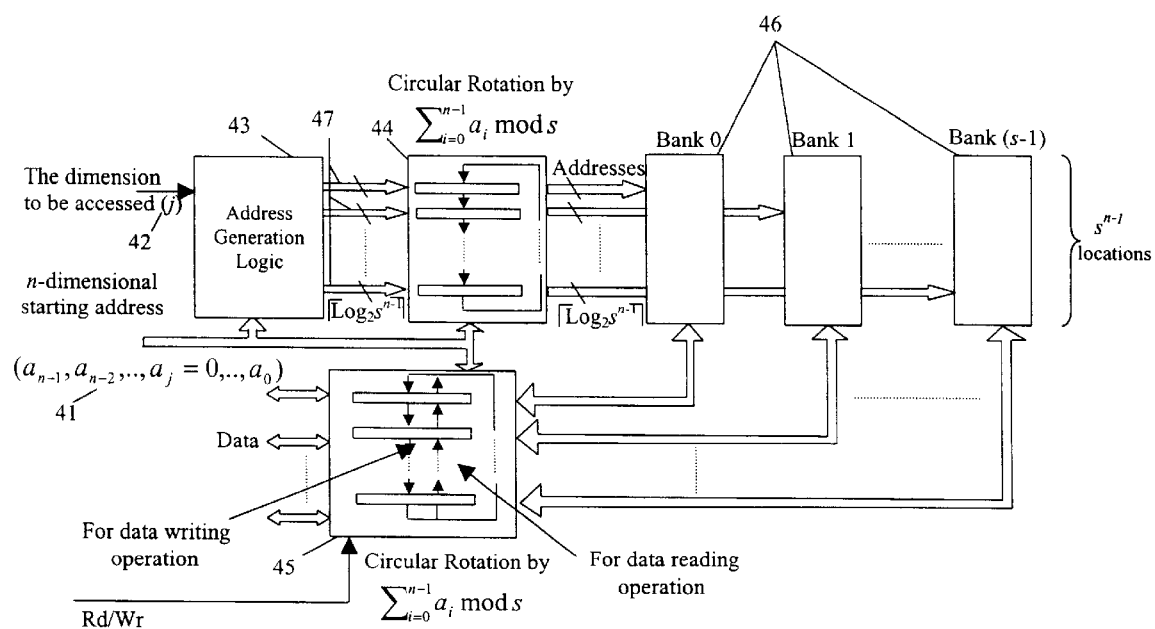
Figure 4: Memory Architecture for Case A under Circular Rotational Permutation

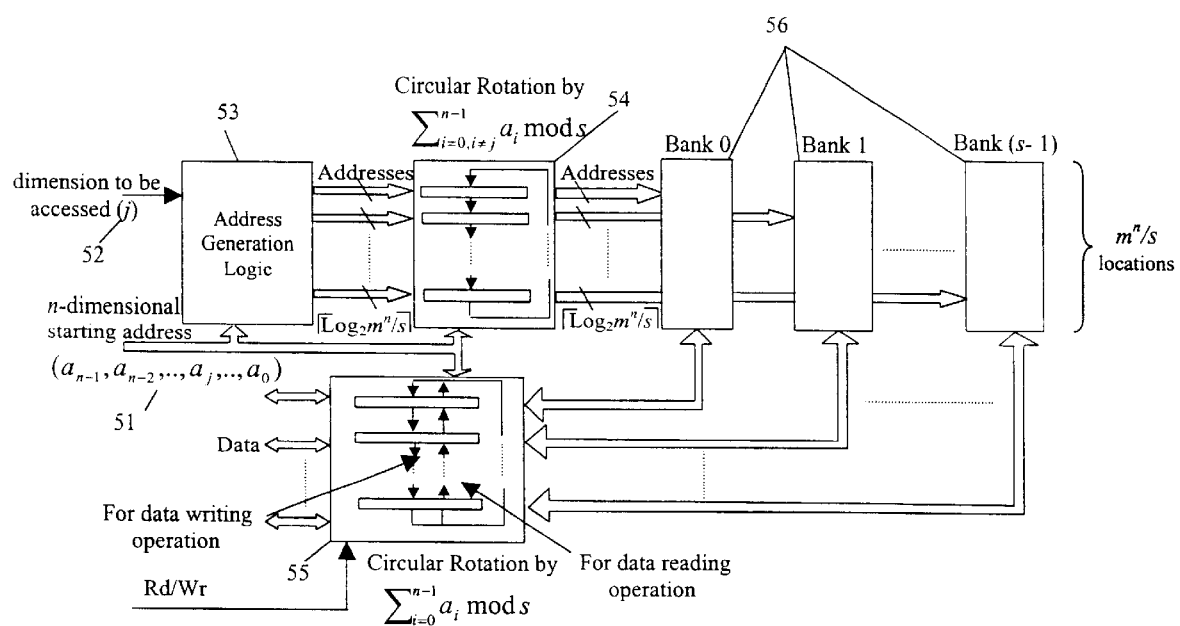
Figure 5: Memory Architecture for Case C under Circular Rotational Permutation

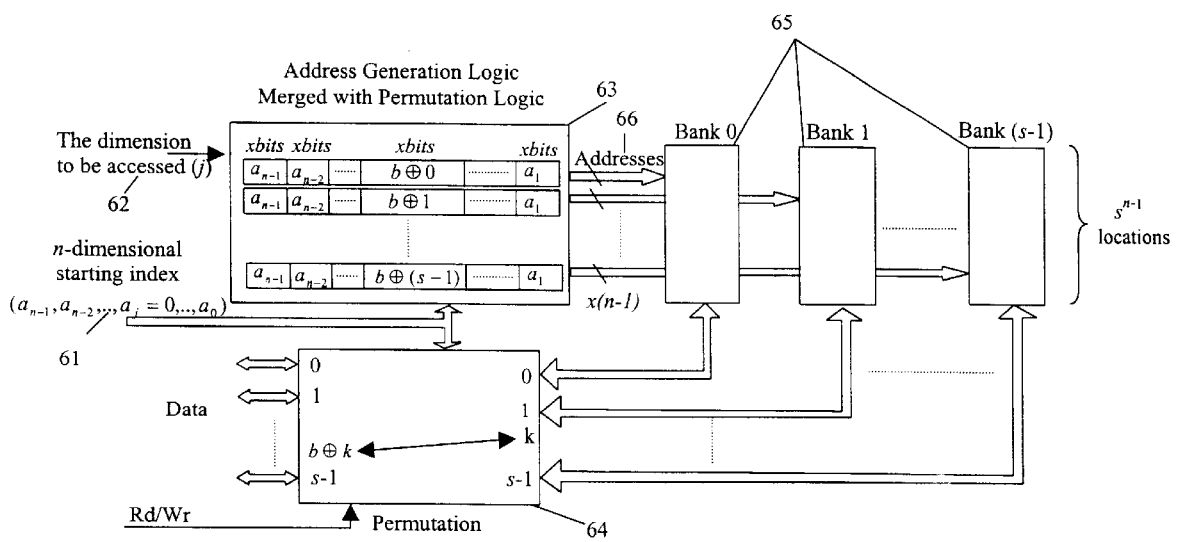
Figure 6: Memory Architecture for Case A under Dyadic Permutation

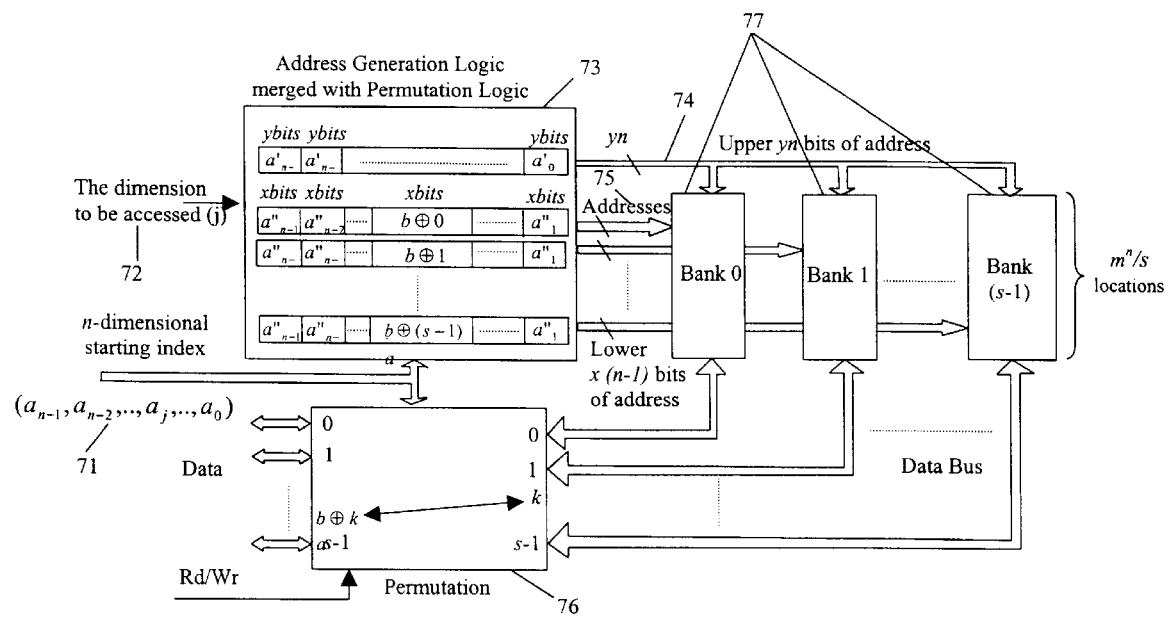
Figure 7: Memory Architecture for Case B under Dyadic Permutation

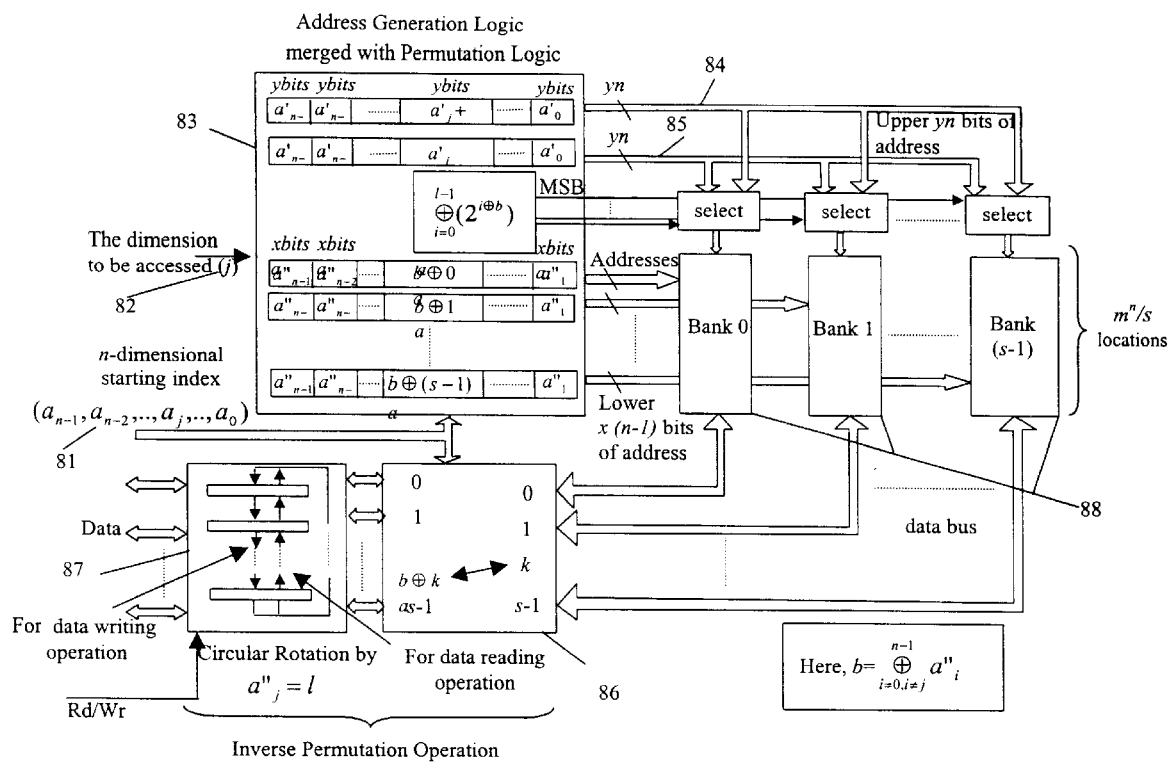
Figure 8: Memory Architecture for Case C under Dyadic Permutation

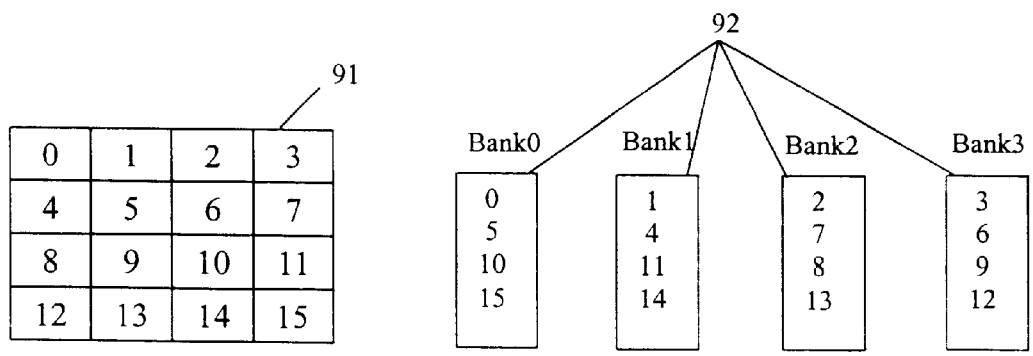
Figure 9: Correspondence between Matrix-Index and Memory Bank

MEMORY ARCHITECTURE FOR PARALLEL DATA ACCESS ALONG ANY GIVEN DIMENSION OF AN N-DIMENSIONAL RECTANGULAR DATA ARRAY

This application claims the benefit of Provisional application No. 60/114,374 filed Dec. 30, 1998.

FIELD OF THE INVENTION

The present invention is related to the field of memory architecture, more specifically, to n-dimensional hyper-matrix (rectangular data array) with s-data elements along each dimension.

BACKGROUND OF THE INVENTION

The design of a memory architecture for a n-dimensional rectangular data array is a well-known problem and its scope stretches to a myriad of applications. The particular cases of parallel data access in 2- and 3-dimensional rectangular data array is of importance for signal processing applications. Specifically, the memory architecture for 2-dimensional data access is attractive for video, image, and graphics processing whereas data access to 3-dimensional space is attractive for 3-dimensional graphics and video signal processing.

Many image and video processing algorithms require either row-wise or column-wise access to data in a 2-dimensional data array (an image or a frame of a video sequence). The most relevant applications are lossy compression algorithms for images and video, which use 2-dimensional separable transforms such as Discrete Cosine Transform (DCT) and Inverse Discrete Cosine Transform (IDCT). These transforms are an integral part of compression techniques utilized in widely accepted video and image compression standards such as MPEG (Moving Picture Expert Group), H.261, H.263, JPEG (Joint Photographic Expert Group), etc. In accordance with the recommendations made in these standards, each image or a frame in a video sequence is divided into macroblocks, which is further divided into blocks of (8×8) data array. In the encoder, the 2D-DCT operation is applied over this block of (8×8) data array followed by quantization and entropy coding to achieve compression. In the decoder, a 2D-IDCT operation is performed after variable length decoding and de-quantization operations. The 2D-DCT (or 2D-IDCT) is a separable transform and can be computed by performing a 1D-DCT (or 1D-IDCT) operation over all the rows of a block followed by a 1D-DCT (or 1D-IDCT) operation over all columns, or vice-versa.

As shown in FIG. 1, after the first 1D-(I)DCT operation 12 over all the rows (or columns) of 8×8 block 11, the data is to be fed to second 1D-(I)DCT block 14 in column-(or row-)wise fashion. This requires a memory 13 which allows both row-wise as well as column-wise access because after the first 1D-(I)DCT operation 12 the data is written into memory 13 in row(column)-wise fashion, whereas for second 1D-(I)DCT operation 14 data is read from the memory 13 in column-(row-)wise fashion. For a DSP 15 processor with SIMD architecture having 4 data-elements vector as operands, each (8×8) block can be divided into four data arrays of size (4×4). For each row (or column) of this (8×8) block, two row-wise (or column-wise) accesses are required to be made, each access fetching four consecutive elements. The present invention provides a scheme that meets this requirement.

Similarly, the 3D-(I)DCT can also be achieved using 1D-(I)DCT but in this case the transpose memory should be such that it allows the parallel access to data along all three dimensions. The present invention describes a memory architecture for a n-dimensional data array allowing parallel access to data along any of the n dimensions.

The problem of 2-dimensional memory architecture allowing row-wise as well as column-wise access is not new, but there is no record of extension of the same concept to higher dimensions to the best of the authors knowledge. As a solution to carrying out 2-dimensional matrix transpose operation, several conventional transpose memories have been proposed.

In U.S. Pat. No. 5,740,340, as is understood, the memory cells are organized as an (s×s) data array. The s rows and s columns are addressed by 2s addresses, and there is a decoder that decodes any one of the said 2s addresses and enables access to said s rows of data and said s columns of data. This solution appears quite restrictive, since it needs a special kind of 2-D memory in which any row or any column can be enabled at a time for accessing. In addition, all enabled locations are accessed at a time. So the extension of this architecture will be very complex for large data arrays which are segmented into smaller (s×s) data sub-arrays as only a complete row (or column) of a data array is enabled, not part of it. The mentioned complexity is not addressed in the disclosed document of the patent. Further, the complexity of this scheme is higher as it involves $s^2$ banks as compared to s banks in the present invention. Moreover, this scheme can not be generalized to n-dimensional data arrays.

The U.S. Pat. No. 5,481,487 appears to suggest a different memory architecture, which requires 4 parallel banks to store one (8×8) data array. Each bank stores one of the four quadrants of the data array, each quadrant being a (4×4) data array. This scheme appears to have the following restrictions:

1. Though address and data buses are provided for all the four banks, not all are accessed in parallel.
2. This memory architecture is restrictive in the sense that it implements only a transpose function. If data is written in row (column) order, it can be read only in column (row) order.
3. This scheme is restricted to only one (8×8) block, and cannot be generalized to store larger 2-dimensional data arrays.
4. This architecture can store consecutive (8×8) blocks (in the same memory locations) but with the following restriction. If a first (8×8) block is written in row-wise (column-wise) order then a second block must be written in column-wise (row-wise) order.
5. This scheme may not be generalized for storing n-dimensional data arrays.

In U.S. Pat. No. 4,603,348, a memory architecture has been described for storing a multi-dimensional array. According to this scheme, the n-dimensional array is divided into a number of divisions, which do not overlap. Each such division is defined as an n-dimensional array with 2 elements in each dimension. The number of banks in the proposed architecture is equal to the number of elements in each of these divisions. Each bank has one data element from a given division, hence enabling the parallel access to all elements of a division. This scheme appears to provide access only to a division of an n-dimensional array. In contrast, the scheme disclosed in the present invention provides access to data along any given dimension.

In U.S. Pat. No. 4,740,927, a bit addressable memory has been proposed in which a 2-dimensional array of bits is divided into partition sectors equal to the number of parallel memory modules (banks) provided. Each memory module has addresses equal to number of bits in each partition sector. Each partition is divided into several s×s matrices, where s is the number of parallel banks. The logical placement of the bits of these matrices is such that bits of any row or column lie in different memory modules, providing parallel access along row and column. However, the present invention proposes an architecture with less complex address generation logic. A particular case of proposed architecture, referred to as memory architecture with dyadic permutation, provides an address generation logic in which a main operation is a logical EXORing operation as against the addition operation in address generation logic proposed in the prior art. Moreover, unlike this scheme, the invention disclosed in this document is much more generic and holds good for a dimension greater than 2 as well.

The present invention provides a novel solution to overcome the disadvantages of the prior arts.

SUMMARY OF INVENTION

The objective of the present invention is to provide a generalized framework of memory architecture for n-dimensional rectangular data arrays such that parallel access to data along any of the n dimensions is possible. It is claimed that the memory architecture of the present invention is generic and less complex as compared to architectures discussed in prior arts. It also overcomes the disadvantages of the prior arts for 2-dimensional transpose memories. The objective of this invention is achieved by applying a simple, yet effective, method of rearranging (permuting) the elements of the data array while reading/writing data from/to the memory. This rearrangement is the distinguishing feature of this invention. The brief description of the invention is as follows.

The proposed memory architecture allows parallel access to s data elements along any given dimension of an n-dimensional data array, each dimension having s-data elements[1]. It is evident that in order to provide parallel access to s-data elements, there must be s-parallel memory banks. The data of this array is stored in these banks in such a fashion that all s data elements of a vector of data, which is parallel to any of the n dimensions, lie in different banks.

[1] For 2-dimension (s×s) data array, it means that the memory architecture of the present invention allows parallel access to all s elements in any row or column of the said data array.

1. More specifically, the present scheme allows parallel access to s-elements along any given dimension of an n-dimensional data array with s-elements in each dimension. For an example with n=s=3, please refer to Sub-array 21 in FIG. 2.
2. The hardware complexity of this scheme is less than the similar solutions proposed in past. The reduction in complexity is achieved by introducing a particular type of rearrangement in the data to be read from/written into the memory. This particular feature makes this scheme different from other solutions for the given problem.
3. Unlike the schemes proposed in prior arts, the scheme described in the present invention is not restricted to only 2-dimensional data arrays. This scheme is generic for n-dimensional rectangular data array.
4. Unlike other similar solutions, this scheme can be extended to cover a larger n-dimensional data array with m (m=st; where t is greater than 1) data elements along each dimension, which can be divided into smaller n-dimensional rectangular data sub-arrays with s-elements along each dimension. Please refer to FIG. 2 for an illustration with n=s=3 and m=6.
5. Further, at the cost of a little more complexity, the scheme can be generalized to access the s data elements in parallel, from any index within an n-dimensional sub-array. More precisely, the s-data elements to be accessed need not start from a boundary of one sub-array and hence may as well stretch to adjacent n-dimension sub-array (Refer to Sub-arrays 22, 23, & 24 in FIG. 2).
6. The complexity of address generation logic in this scheme gets reduced significantly if the parameter s is an integer power of 2.
7. This scheme can also be used to access data serially, if addresses are issued serially.

BRIEF DESCRIPTION OF THE DRAWINGS [2]

FIG. 1 shows the implementation of 8×8 2D-(I)DCT using 8-point 1D-(I)DCT.

FIG. 2 shows the possible accesses in the proposed memory architectures which allows parallel access to 3 data elements (i.e., s=3) in 3-dimensional data array.

FIG. 3 shows the basic memory architecture for n-dimensional rectangular data array with m data elements along each dimension.

FIG. 4 shows a memory architecture for Case A under Circular Rotation Permutation.

FIG. 5 shows a memory architecture for Case C under Circular Rotation Permutation.

FIG. 6 shows a memory architecture for Case A under Dyadic Permutation.

FIG. 7 shows a memory architecture for Case B under Dyadic Permutation.

FIG. 8 shows a memory architecture for Case C under Dyadic Permutation.

FIG. 9 shows the correspondence between an index in a 4×4 matrix and a location in memory bank.

[2] Cases A, B and C mentioned here are defined in section on "Detailed Description of the Preferred Embodiments".

DETAILED DESCRIPTION OF THE PREFERRED EMBODIMENTS

The present invention provides a generalized framework for a memory architecture for a n-dimensional rectangular data array, which enables parallel access to data along any of the n dimensions. The underlying concept of this invention is first described in a generic sense with an aim to define a class of architectures, which include all possible variants of this scheme. Subsequently, a scheme is described with examples for a particular case, which, apparently, has the least complexity in the class of variants of that case. Before proceeding further, the following three definitions have been provided to enhance the readability of the document.

1.1 Definitions 1. n-dimensional hyper-matrix: It is an n-dimensional rectangular data array. Any location of a data element in an n-dimensional hyper-matrix is given by index $[a_{n-1}, a_{n-2}, \ldots, a_j, \ldots, a_0]$. Here, $a_j$ is the index for dimension j. The data array has a single data value stored at each of its locations.

2. p-bounded n-dimensional hyper-matrix: It is an n-dimensional hyper-matrix with p data elements along each dimension (i.e. $a_i \in \{0,1,\ldots,p-1\}$). For example, a p-bounded 2-dimensional hyper-matrix is a (p×p) matrix. The notation (p,n)-hyper-matrix is used to represent a p-bounded n-dimensional hyper-matrix. In this document, a (m,n)-hyper-matrix with m=st (t being an integer greater than one); will be assumed to be divided into $t^n$ number of smaller (s,n)-hyper-matrices. The starting index of each (s,n)-hyper-matrix in (m,n)-hyper-matrix is an integer multiple of s along each of the n-dimensions.

3. Data Vector: A data vector in a (m,n)-hyper-matrix is a sequence of s data in the hyper-matrix along any given dimension. It is defined by the index of the starting location in the hyper-matrix and the dimension along which its elements lie. A data vector along the dimension j which starts from the index $[a_{n-1}, a_{n-2}, \ldots, a_j=d, \ldots, a_0]$, constitutes a sequence of data at indices given by $[a_{n-1}, a_{n-2}, \ldots, a_j=d, \ldots, a_0], [a_{n-1}, a_{n-2}, \ldots, a_j=(d+1), \ldots, a_0], \ldots, [a_{n-1}, a_{n-2}, \ldots, a_j=(d+s-1), \ldots, a_0]$. Here, $0<=d<=m-s$. It should be noted that, for data vectors along the dimension j in an (s,n)-hyper-matrix, the index $a_j$ in the starting location will be 0.

1.2 Theory of Underlying Concept

The present invention describes a memory architecture with s parallel banks for storing all data elements of a (s,n)-hyper-matrix, so as to enable parallel access to all the s data elements of a data vector. Since s data elements are accessed in parallel, the total number of banks used in this invention are indeed minimum. The data of a (s,n)-hyper-matrix is re-arranged before it is stored in the s-parallel banks of memory. The rearrangement of data is such that it ensures that all s elements of any data vector in this (s,n)-hyper-matrix are stored in different banks.

Two functions, g and f define the rearrangement described above. These functions take the index of a data element as its argument. The data element at index $[a_{n-1}, a_{n-2}, \ldots, a_0]$ in the (s,n)-hyper-matrix is mapped to address $g(a_{n-1}, a_{n-2}, \ldots, a_0)$ in the bank number $f(a_{n-1}, a_{n-2}, \ldots, a_0)$.

$$g, f: [a_{n-1}, a_{n-2}, \ldots, a_0] \to (\text{address}=g(a_{n-1}, a_{n-2}, \ldots, a_0),$$
$$\text{bank\_number}=g(a_{n-1}, a_{n-2}, \ldots, a_0)) \quad \text{Equation 1:}$$

Functions, f and g must satisfy the following conditions to ensure the parallel access to all elements of any data vector.

Condition 1: $g(a_{n-1}, a_{n-2}, \ldots, a_0) \in \{0, 1, \ldots, s^{n-1}-1\}$ and $f(a_{n-1}, a_{n-2}, \ldots, a_0) \in \{0, 1, \ldots, s-1\}$ Condition 2: The function $f(a_{n-1}, a_{n-2}, \ldots, a_0)$ should be such that for any given value of j, $f(a_{n-1}, a_{n-2}, \ldots, a_j=p, \ldots, a_0)$ equals to $f(a_{n-1}, a_{n-2}, \ldots, a_j=q, \ldots, a_0)$, only if p=q. This condition ensures that all s elements of any data vector maps to different memory banks.

Condition 3: Further, g and f should be such that above mentioned mapping is one-to-one. It means that the pair $(g(a_{n-1}, a_{n-2}, \ldots, a_0), f(a_{n-1}, a_{n-2}, \ldots, a_0))$ will be unique for any given index $[a_{n-1}, a_{n-2}, \ldots, a_0]$. This condition ensures that no two data elements of a hyper-matrix are stored at the same address in the same bank.

It is claimed that for a given value of n and s (in an (s,n)-hyper-matrix), many such rearrangements are possible. In other words, there exists more than one distinct pair of functions (g,f) for given values of n and s.

The present invention scheme can easily be generalized for a (m,n)-hyper-matrix, which is assumed to be divided into (s,n)-hyper-matrices (Please refer to FIG. 2 for illustration). The different (s,n)-hyper-matrices in the (m,n)-hyper-matrix are linearly mapped in s-parallel banks. It should be noted that for each (s,n)-hyper-matrices, the data is rearranged before it is stored in the memory. In this context, at least two variations are possible.

1. All s data elements of the accessed data vector, lie within a given (s,n)-hyper-matrix,
2. All s data elements of the data vector to be accessed, may span over two adjacent (s,n)-hyper-matrix.

1.3 Description of Basic Memory Architecture

The basic architecture for proposed memory for (m,n)-hyper-matrix is shown in FIG. 3. Here, m=st and t is an integer. For storing the s-data elements of any data vector into the memory banks, n-dimensional starting index, the dimension along which the data is to be stored, and the s data elements are provided to this architecture. For reading s data elements in parallel, the n-dimensional starting index and the dimension of access are provided to the memory architecture. Based on these, the addresses for all of s banks 34 are computed by Address Generation Logic 31 and issued to the banks 34 after carrying out a permutation (rearrangement) by Permutation Logic 32, which ensures that only the required locations are accessed in each bank. The Inverse Permutation Logic 33 for the data read from (written into) the memory is inverse (same) of Permutation Logic 32 for addresses. Although, the Address Generation Logic 31 and Permutation Logic 32 are shown as separate blocks, they can be merged into one block.

As discussed earlier, for a given value of n and s (in an (s,n)-hyper-matrix), many such rearrangements are possible. The Address Generation Logic 31 defined by the functions g and f are different for each rearrangement. Therefore, the complexity of the Address Generation 31 and Permutation Logic 32 in the architecture described in FIG. 3 will also be different for different rearrangements. Among all possible rearrangements, the preferable ones are those which lead to simpler and regular hardware. All other possible rearrangements for a given value of n and s are claimed to be different architectural realizations though conceptually same as discussed in the present invention. One class of such rearrangements is permutation along any one dimension. In the rest of the document, the permutation along $0^{th}$ dimension is taken up without loss of generality. For this case, the permutation and address generation logic is also provided.

1.1 Permutation Along $0^{th}$ Dimension

In an (s,n)-hyper-matrix, there are $s^{n-1}$ data vectors which are along the $0^{th}$ dimension. The starting index for these data vectors is given by $[a_{n-1}, a_{n-2}, \ldots, a_1, 0]$. For this case, s-elements of any such data vector are stored at the same memory address but in different banks. The bank number for elements of any such given data vector is obtained by using a function f, which satisfies the conditions mentioned earlier. The advantage of this rearrangement is that the mapping (function g) of the elements of data vectors to address in the banks becomes independent of the function f. The address function $g(a_{n-1}, a_{n-2}, \ldots, a_1, a_0)$ is taken as $$\sum_{i=1}^{n-1} a_i s^{i-1},$$

which clearly satisfies the Condition 1 for function g. It should be noted that $a_0$ is not involved in computation of the address for the banks 34, as the address is same for all elements of these data vectors. Since, $a_0$ will be different for all elements of any such data vector, the function f will ensure that these elements are indeed stored in different banks. Hence, Condition 3 is also satisfied.

In reference to the memory architecture of FIG. 3 for this case, the data at index $[a_{n-1}, a_{n-2}, \ldots, a_0]$ in the (s,n)-hyper-matrix is stored at the address $g(a_{n-1}, a_{n-2}, \ldots, a_1, a_0)$ $$\left( = \sum_{i=1}^{n-1} a_i s^{i-1} \right)$$

in the bank number given by $f(a_{n-1}, a_{n-2}, \ldots, a_0)$. Now for accessing a data vector along jth dimension and starting from index $[a_{n-1}, a_{n-2}, \ldots, a_j=0, \ldots, a_0]$, the Address Generation Logic 31 generates addresses $$\sum_{i=1, i \neq j}^{n-1} a_i s^{i-1}, \sum_{i=1, i \neq j}^{n-1} a_i s^{i-1} + s^{j-1},$$

$$\sum_{i=1, i \neq j}^{n-1} a_i s^{i-1} + 2s^{j-1}, \ldots, \sum_{i=1, i \neq j}^{n-1} a_i s^{i-1} + (s-1)s^{j-1}.$$

The Permutation Logic 32 permutes these addresses using function f and send them to banks $f(a_{n-1}, a_{n-2}, \ldots, a_j=0, \ldots, a_0)$, $f(a_{n-1}, a_{n-2}, \ldots, a_j=1, \ldots, a_0), \ldots, f(a_{n-1}, a_{n-2}, \ldots, a_j=s-1, \ldots, a_0)$, respectively. The read vector is obtained after applying inverse permutation in Inverse Permutation Logic 33.

A permutation function f is to be defined to complete the description of the memory architecture. Among all rearrangements corresponding to the permutation along any given dimension, the one which is obtained by dyadic permutation appear to be the least complex for values of s which is an integer power of 2. For any general value of s, a circular permutation can be used. These two permutations are taken up to explain the concept for following three scenarios.

Case A This memory architecture is for a (s,n)-hyper-matrix which allows parallel access to all elements of any data vector, Case B This memory architecture is for a (m,n)-hyper-matrix which is divided into a (s,n)-hyper-matrix. This memory architecture allows parallel access to all elements of any data vector which lies within a single (s,n)-hyper-matrix, Case C This memory architecture is for a (m,n)-hyper-matrix which is divided into a (s,n)-hyper-matrix. It allows parallel access to all s data elements of any data vector which may span over two adjacent (s,n)-hyper-matrix. It should be noted that Case B is the special case of Case C.

1.4.1 Memory Architecture for Circular Rotational Permutation

The permutation function corresponding to circular rotation is given below. It is obvious from the properties of mod s addition that this function satisfies Conditions 1 and 3.

$$f(a_{n-1}, a_{n-2}, \ldots, a_0) = (a_{n-1} + a_{n-2} + \ldots + a_0) \bmod s \quad \text{Equation 2}$$

Case A: For this permutation function, the data at index $[a_{n-1}, a_{n-2}, \ldots, a_0]$ in the (s,n)-hyper-matrix is stored at the address $$\sum_{i=1}^{n-1} a_i s^{i-1}$$

in the bank number given by $$\sum_{i=0}^{n-1} a_i$$

mod s (refer to FIG. 4). More precisely, for accessing all s data elements in parallel manner along the jth dimension 42 from $[a_{n-1}, a_{n-2}, \ldots, a_j=0, \ldots, a_0]$ starting index 41, the s addresses 47 are $$\sum_{i=1, i \neq j}^{n-1} a_i s^{i-1}, \sum_{i=1, i \neq j}^{n-1} a_i s^{i-1} + s^{j-1},$$

$$\sum_{i=1, i \neq j}^{n-1} a_i s^{i-1} + 2s^{j-1}, \ldots, \sum_{i=1, i \neq j}^{n-1} a_i s^{i-1} + (s-1)s^{j-1}.$$

Here, $s^{-1}$ should be treated as 0. The Permutation Logic 44 for the addresses is an anti-clockwise circular rotation by $$\sum_{i=0}^{n-1} a_i$$

mod s. The direction of circular rotation in Inverse Permutation Logic 45 is anti-clockwise for storing data into the memory, whereas it is reverse (clockwise) for reading data from memory. The amount of rotational shift in Inverse Permutation Logic 45 for the data read/write operation remains the same as for the addresses.

Case C: The basic architecture (shown in FIG. 5) for this generalization (an (m,n)-hyper-matrix where m=st and $a_i$'s ($0<=i<n$; $0<=a_i<m$) being the indices along the dimension i) remains the same as in Case A, only the address generation logic and width of the address bus changes. For a given value of index $a_i$; let $a_i''=(a_i \bmod s)$ and $a_i'=(a_i-a_i'')$. For the s consecutive data elements to be accessed along the $j^{th}$ dimension 52, starting from index $[a_{n-1}, a_{n-2}, \ldots, a_j, \ldots, a_0]$ 51, let the index of $k^{th}$ accessed elements be denoted by $[a_{n-1}^k, a_{n-2}^k, \ldots, a_j^k, \ldots, a_0^k]$.

For all the s data elements to be accessed only index $a_j^k$ in the n-dimensional index is different and the others remain same. The index $a_j^k$ is equal to $a_j+k$. Therefore, the s addresses generated by Address Generation Logic 53 for the memory banks 56 are given by $$\sum_{i=1}^{n-1} (a_i'^k t^i s^{n-1} + a_i''^k s^{i-1}) + a_0'^k s^{n-1}$$

where $k=0, \ldots, (s-1)$. The Permutation Logic 54 for the addresses is an anti-clockwise circular rotation by $$\sum_{i=0, i \neq j}^{n-1} a_i$$

mod s. The direction of circular rotation in Inverse Permutation Logic 55 is anti-clockwise for storing data into the memory, whereas it is reverse (clockwise) for reading data from memory. The amount of rotational shift for the data read/write operation in the Inverse Permutation Logic 55 is given by $$\sum_{i=0}^{n-1} a_i$$

mod s.

Case B: This is a specific instance of Case C. For this case, the index $a_j$ in the n-dimensional index of the first data in the required data vector will be such that $a_j''=0$. The $a_j^k$ will be equal to ($a_j$+k) for the s successive data. Hence, the term for address calculation $$\left(\sum_{i=1}^{n-1}(a_i'^k t^i s^{n-1} + a_i''^k s^{i-1}) + a_0'^k s^{n-1}\right)$$

can be simplified to b+ks$^{j-1}$, where $$b = \sum_{i=1}^{n-1}(a_i' t^i s^{n-1} + a_i'' s^{i-1}) + a_0' s^{n-1}.$$

Here, s$^{-1}$ should be treated as 0.

1.4.2 Memory Architecture under Dyadic Permutation (for s=$2^x$)

For numerous signal-processing applications, n-dimensional memory architectures with s as an integer power of 2 are of much importance. The complexity of the hardware to realize all of the architectures described in Subsection 1.4.1 gets reduced significantly if s is a power of 2. The advantage is obvious from the fact that the computation of all terms of type $a_i s^{i-1}$ is equivalent to left shifting of $a_i$ by (i-1).x bits and the (mod s) operation is equivalent to logical AND operation with (s-1). Further, the dyadic permutation function gives much simpler permutation logic. Another advantage of this permutation function is that the permutation logic turns out to be same as inverse permutation logic. It is easy to see that this permutation function satisfies the Conditions 1 and 3.

$$f(a_{n-1}, a_{n-2}, \ldots, a_0) = a_{n-1} \oplus a_{n-2} \oplus \ldots \oplus a_0 \quad \text{Equation 3}$$

Here, $\oplus$ denotes the bit-wise EXORing.

Case A: For the dyadic permutation function described above, the data at index [$a_{n-1}$, $a_{n-2}$, . . . , $a_0$] in the hyper-matrix is stored at the address $$\sum_{i=1}^{n-1} a_i s^{i-1}$$

in the bank number given by $$\bigoplus_{i=0}^{n-1} a_i.$$

More precisely, for accessing all s-data elements of a data vector which is parallel to j$^{th}$ dimension 62 and starts from the index [$a_{n-1}$, $a_{n-2}$, . . . , $a_j$=0, . . . , $a_1$, $a_0$] 61, the s addresses 66 are $$\sum_{i=1,i\neq j}^{n-1} a_i s^{i-1}, \sum_{i=1,i\neq j}^{n-1} a_i s^{i-1} + s^{j-1},$$

$$\sum_{i=1,i\neq j}^{n-1} a_i s^{i-1} + 2s^{j-1}, \ldots, \sum_{i=1,i\neq j}^{n-1} a_i s^{i-1} + (s-1)s^{j-1}.$$

Here, s$^{-1}$ should be treated as 0. The proposed memory architecture is given in FIG. 6.

The operation $$\sum_{i=1,i\neq j}^{n-1} a_i s^{i-1}$$

is equivalent to concatenating binary values of $a_{n-1}$, $a_{n-2}$, . . . , $a_1$ to form a single x(n-1) bit address. The s successive addresses are generated by stuffing values 0, 1, . . . , (s-1) at bit locations corresponding to a, in x(n-1) bit address. The Inverse Permutation Logic 64 is equivalent to issuing the k$^{th}$ address to memory bank $$\left(k \oplus \left(\bigoplus_{i=0}^{n-1} a_i\right)\right).$$

In FIG. 6, b is equal to $$\bigoplus_{i=0}^{n-1} a_i.$$

It is easy to see that the Address Generation Logic and the Permutation Logic modules can be combined into single module 63.

Case B: Let (m,n)-hyper-matrix with m=$2^{x+y}$ be divided into (s,n)-hyper-matrices. These (s,n)-hyper-matrix are linearly mapped to the memory space. The architecture to access data within a hyper-matrix, however, remains the same. Hence, if s-parallel data are to be accessed along the direction parallel to j$^{th}$ dimension 72 starting from index [$a_{n-1}$, $a_{n-2}$, . . . , $a_j$, . . . , $a_1$] 71, then upper y bits of indices $a_i$'s will yield the address 74 of the (s,n)-hyper-matrices and lower x bits of $a_i$'s will give the addresses 75 for data within the (s,n)-hyper-matrices. Moreover, lower x bits of $a_j$ will be 0 as data is to be accessed from the boundary of the (s,n)-hyper-matrices. Here, $a_i$'s are (x+y) bits wide. In the architecture given in FIG. 7, a'$_i$ and a"$_i$ denote the upper y and lower x bits of $a_i$, respectively. The yn bits 74, obtained by concatenating the a'$_i$'s, gives the upper bits of address for each bank 77, whereas lower x bits are obtained by using a"$_i$'s in the method described in Case A. Here, b is equal to $$\bigoplus_{i=0}^{n-1} a_i''.$$

Case C: In this case, the index of the first data in the data vector may start from the data element that does not lie on the boundary of (s,n)-hyper-matrix. If the first data to be accessed is l data elements away from the boundary of any (s,n)-hyper-matrix (i.e., l=a"$_j$), then first (s-l) data elements will belong to same (s,n)-hyper-matrix whereas the next l elements will belong to the adjacent (s,n)-hyper-matrix along the j$^{th}$ dimension. More precisely, the upper y bits will be a'$_j$ for first (s-l) data and (a'$_j$+1) for the next l data. If l is equal to 0, a'$_j$ will be used for computing upper yn bits of addresses 84 and 85 for all banks 88. Moreover, permutation of data also involves circular rotation by l 87. For writing operation, the circular rotation is in anti-clockwise direction, whereas clockwise direction for data reading operation (refer to FIG. 8).

1.5 An Example of a Single 2-Dimensional Data Array with s=4

This example illustrates the above-described scheme for a 2-dimensional (4×4) matrix 91. The correspondence between location in matrix 91 and memory banks 92 for data elements is shown in FIG. 9 for dyadic permutation case. It is apparent from the shown rearrangement that elements of the matrix 91, which lie in the same row (or column) are stored in different banks 92. Accessing this memory bank 92 involves two steps:

1. Computing the address for each bank;
2. Reordering of the 4-element after (before) reading (writing) from the 4 banks.

The following table indicates the bank number in which the $i^{th}$ data element in the $a^{th}$ row (or column) lies. This can be used to reorder the data elements for reading from or writing into the memory banks.

TABLE 1

Bank number for ith data element in ath row or column

| | a | | | |
|---|---|---|---|---|
| i | 0 | 1 | 2 | 3 |
| 0 | 0 | 1 | 2 | 3 |
| 1 | 1 | 0 | 3 | 2 |
| 2 | 2 | 3 | 0 | 1 |
| 3 | 3 | 2 | 1 | 0 |

It is apparent that for column-wise access, the 2-bit address for all data elements in the column to be read (or written into) from the memory is same as index i. On the other hand, row-wise access the address is same as row number a of the data element.

2 Alternative Embodiments of the Invention

The following are alternate embodiments of the present invention.

1. Though the scheme has been described for only two rearrangements, all other rearrangements under the scope of discussion in the previous section will lead to other alternative implementations of the same scheme.
2. If any application demands access along only some particular dimensions, then minor variation of the proposed scheme will lead to significant reduction in hardware complexity.
3. For the Cases B and C discussed in Section 0, the number of elements along each dimension need not be same for larger hyper-matrix. That is, the value of m may be different for each dimension. For this alternative implementation, only the address computation for accessing any (s,n)-hyper-matrix will change, the logic to compute addresses for elements data vector within (s,n)-hyper-matrix will remain same.
4. Though the scheme has been described for parallel access, it can be also used for accessing the data in serial. It can be accomplished by issuing all the addresses corresponding to s-data elements sequentially. Given the constraint of sequential access, some minor changes in the architecture will lead to reduction in hardware complexity.

What is claimed is:

1. An apparatus for providing parallel access to data elements of a data vector of an n-dimensional rectangular array, comprising:

an address generation logic module, for receiving an index of a first data element of a data vector to be stored into memory and for receiving a dimension of access, generating addresses to which to store the data elements of the data vector, the address generation logic requiring that each data element of a data vector is stored in a different memory bank to allow parallel access along any dimension of the n-dimensional rectangular array;

a permuter, coupled to the address generation logic module, for receiving the addresses, receiving the dimension of access, and receiving the index information of the first data element of the data vector, for carrying out a permutation operation on the addresses by generating a bank number of a memory bank to which to issue the addresses, the permuter requiring that each data element of a data vector is stored in a different memory bank to allow parallel access along any dimension of the n-dimensional rectangular array, and for storing data elements at the generated address and bank number corresponding to the each data element of the data vector; and at least s memory banks, coupled to the permuter to allow parallel access by the permuter to the s memory banks, to receive addresses to store each data element of the data vector, where s is equal to the number of data elements in a data vector.

2. The apparatus of claim 1 further comprising:

an inverse permuter, for receiving the index information of the first data element of a data vector and for receiving the information of a read operation, and coupled to the s memory banks, for performing the permutation operation on data elements, which is the inverse of the permutation operation performed by the permuter on the addresses, to generate the bank numbers from which to retrieve the data elements of the data vector.

3. The apparatus of claim 2 wherein the inverse permuter receives information about a write operation, and is coupled to store data to the s-memory banks responsive to performing the same permutation operation as the permutation operation performed by the permuter on the addresses, to generate the bank numbers to which to store the data elements of the data vector.

4. The apparatus of claim 3 wherein the inverse permuter generates the memory bank number for each data element of the data vector to achieve shuffling of the data elements prior to sending the data to the memory banks.

5. The apparatus of claim 3 wherein the permuter and the inverse permuter perform circular rotation.

6. The apparatus of claim 5 for a (s,n)-hyper-matrix, wherein the circular rotation performed by the permuter and inverse permuter is given by $$f(a_{n-1}, a_{n-2}, \ldots, a_0) = \sum_{i=0}^{n-1} a_i \bmod s,$$

where $[a_{n-1}, a_{n-2}, \ldots, a_{n-0}]$ is the index of first data element of the data vector, n is the dimension of the data array, and s is the number of data elements in the data vector.

7. The apparatus of claim 6 wherein for data at index $[a_{n-1}, a_{n-2}, \ldots, a_{n-0}]$ in the (s,n)-hyper-matrix, the address logic generator generates an address responsive to:

$$\text{Address} = \sum_{i=1}^{n-1} a_i s^{i-1}.$$

8. The apparatus of claim 5 for a (m,n)-hyper-matrix, wherein the circular rotation performed by the permuter and inverse permuter permits parallel access to all s data elements of any data vector which may span over two adjacent (s,n)-hyper-matrices, and the parameter for permuter is given by:

$$\sum_{i=0, i \neq j}^{n-1} a_i \bmod s,$$

and the parameter for inverse permuter is given by:

$$\sum_{i=0}^{n-1} a_i \bmod s,$$

where $[a_{n-1}, a_{n-2}, \ldots, a_0]$ is the index of first data element of the data vector, j is the dimension of access, n is the dimension of the data array, s is the number of data elements in the data vector, and m=st where t is an integer.

9. The apparatus of claim 8 wherein the address logic generator generates an address responsive to:

$$\sum_{i=1}^{n-1} (a_i'^k t^i s^{n-1} + a_i''^k s^{i-1}) + a_0'^k s^{n-1}$$

where k=0, ..., (s−1), $a_i'' = (a_i \bmod s)$ and $a_i' = (a_i - a_i'')$.

10. The apparatus of claim 3 wherein the permuter and inverse permuter perform dyadic permutation.

11. The apparatus of claim 10 wherein the permuter and the inverse permuter performs dyadic permutation responsive to: $f(a_{n-1}, a_{n-2}, \ldots, a_0) = a_{n-1} \oplus a_{n-2} \oplus \ldots \oplus a_0$, where $\oplus$ denotes bit-wise EXORing, $[a_{n-1}, a_{n-2}, \ldots, a_0]$ is the index of the first data element of the data vector and n is the dimension of the data array.

12. The apparatus of claim 11 wherein the address generation logic generates an address responsive to:

$$\text{Address} = \sum_{i=1}^{n-1} a_i s^{i-1}.$$

13. The apparatus of claim 10 for a (m,n)-hyper-matrix, wherein permutation performed by the permuter is dyadic permutation and that performed by the inverse permuter is a combination of dyadic and circular permutation, which permits parallel access to all s data elements of any data vector which may span over two adjacent (s,n)-hyper-matrices, and the parameter for dyadic permutation in the permuter and inverse permuter is given by:

$$\bigoplus_{i=0, i \neq j}^{n-1} a_i,$$

the parameter for circular permutation is given by $a_j \bmod s$, where $\oplus$ denotes bit-wise EXORing, $[a_{n-1}, a_{n-2}, \ldots, a_0]$ is the index of the first data element of the data vector, j is the dimension of access, n is the dimension of the data array, s is the number of the data elements in the data vector, and m=st where t is an integer.

14. The apparatus of claim 13 wherein the address logic generator generates an address responsive to:

$$\sum_{i=1}^{n-1} (a_i'^k t^i s^{n-1} + a_i''^k s^{i-1}) + a_0'^k s^{n-1}$$

where k=0, ..., (s−1), $a_i'' = (a_i \bmod s)$ and $a_i' = (a_i - a_i'')$.

15. The apparatus of claim 2 wherein the inverse permuter generates the memory bank number for each data element of the data vector to achieve shuffling of the data elements after retrieving the data from the memory banks.

16. The apparatus of claim 1 wherein the address generation logic and the permuter are integrated into a single module.

17. The apparatus of claim 1 wherein the address generation logic generates an address for storing each data element of a data vector to memory and the permuter generates a memory bank number for the generated address for storing each data element of a data vector to the memory banks.

18. The apparatus of claim 1 wherein the address generation logic generates an address for retrieving each data element of a data vector from memory and the permuter generates a memory bank number for the generated address for retrieving each data element of a data vector from the memory banks.

19. The apparatus of claim 1 wherein there are a total of m memory banks, where m is equal to s multiplied by a positive integer.

20. The apparatus of claim 1 wherein the n-dimensional rectangular array comprises at least three dimensions.

* * * * *